United States Patent [19]

Nakatani

[11] Patent Number: 5,409,264

[45] Date of Patent: Apr. 25, 1995

[54] DEFORMABLE UNDER BODY INCLUDING DEFORMABLE FRAME MEMBERS FOR PROTECTING A FUEL VAPOR CANISTER

[75] Inventor: Shiro Nakatani, Higashihiroshima, Japan

[73] Assignee: Mazda Motor Corporation, Hiroshima, Japan

[21] Appl. No.: 6,291

[22] Filed: Jan. 19, 1993

[30] Foreign Application Priority Data

Jan. 18, 1992 [JP] Japan .................. 4-007000

[51] Int. Cl.6 .................................... B62D 21/15
[52] U.S. Cl. ......................... 280/834; 280/784
[58] Field of Search ........... 280/834, 784; 296/189, 296/194, 195, 204; 180/374

[56] References Cited

U.S. PATENT DOCUMENTS

| | | | |
|---|---|---|---|
| 3,881,742 | 5/1975 | Felzer | 280/784 |
| 3,884,255 | 5/1975 | Merkle | 280/834 |
| 4,621,822 | 11/1986 | Knöchelmann et al. | 280/834 |
| 4,787,643 | 11/1988 | Shirata | 280/734 |
| 5,065,836 | 11/1991 | Hamada et al. | 180/245 |
| 5,114,184 | 5/1992 | Shimomura | 280/834 |
| 5,195,780 | 3/1993 | Inoue | 280/834 |

FOREIGN PATENT DOCUMENTS 63-89829 6/1988 Japan .
3-33721 4/1991 Japan .

*Primary Examiner*—Karin L. Tyson
*Attorney, Agent, or Firm*—Fish & Richardson

[57] ABSTRACT

An under body structure of an automotive vehicle including a transfer unit for transferring an engine output to vehicle wheels. A canister device for taking in fuel vapor is supported at a vehicle body frame member. The canister device is disposed in back of the transfer unit. The frame design and cross member arrangement allow displacement of the canister device when the vehicle is involved in a collision. This arrangement prevents the canister device from being contacted by rearward movement of the transfer unit.

18 Claims, 5 Drawing Sheets

DEFORMABLE UNDER BODY INCLUDING DEFORMABLE FRAME MEMBERS FOR PROTECTING A FUEL VAPOR CANISTER

BACKGROUND OF THE INVENTION

1. Field of the Invention

The present invention relates to an under body structure of an automotive vehicle having a transfer unit for transferring an output of an engine to vehicle wheels, and more particularly to an under body structure of an automotive vehicle having a canister device for taking in a vapor of a fuel in a fuel tank, which is disposed adjacent to the transfer unit.

2. Description of the Related Art

A known four-wheel drive automotive vehicle includes a transfer unit for transferring an output of an engine to front wheels and rear wheels. A fuel tank of the known four-wheel drive automotive vehicle is generally disposed in back of the transfer unit as shown for example in Japanese Laid-Open Utility Model Application (Jikkai) No. 63-89,829 (1988). Further, the normal automotive vehicle has a canister device for taking in fuel vapor from the fuel tank as shown for example in Japanese Laid-open Utility Model Application (Jikkai) No. 3-33721 (1991). The fuel vapor is trapped temporarily by the canister device and then returned to an intake device of the engine. A canister device with a large capacity has been recently desired for effective prevention of air pollution. Since the canister device needs such a large space in which to be located, it is difficult to dispose the canister device beside the fuel tank.

The canister device may be supported on a vehicle body frame member so that the canister device is disposed in an open space behind the transfer unit noted above. If the canister device is located behind the transfer unit and the vehicle is involved in a collision, the transfer unit may move back and can break the canister device thereby allowing fuel vapor to be released.

SUMMARY OF THE INVENTION

It is an object of the present invention to provide an under body structure of an automotive vehicle which can provide a useful layout of the structures under the floor panel including the canister device while avoiding contact between the canister device and a transfer unit in case of a collision of the vehicle. This object is accomplished by providing an under body structure of an automotive vehicle including a transfer unit. The transfer unit's function is to transfer the engine output to a vehicle wheel. A vehicle body frame member is disposed under a floor panel of the vehicle so as to extend in a longitudinal direction of the vehicle. A canister device is provided for taking in fuel vapor from a fuel tank and it is supported at the vehicle body frame member and disposed in back of the transfer unit. The invention includes a means for controlling displacement of the canister device including a predetermined deformation of the vehicle body frame members when the vehicle is involved in a collision. This means controls the displacement of the canister device so that the canister device is prevented from being contacted by the transfer unit.

The present invention also can be accomplished by an under body structure of a four-wheel drive automotive vehicle including a transfer unit for transferring the engine output to the four wheels of the vehicle. The transfer unit is disposed under a floor panel of the vehicle. A first propeller shaft for the front wheels and a second propeller shaft for the rear wheels are connected to the transfer unit respectively. A pair of vehicle body frame members are disposed under the floor panel of the vehicle and extend along a length of the vehicle. The pair of vehicle body frame members are interconnected with a cross member on which the transfer unit is mounted. A canister device for taking in fuel vapor from the fuel tank is mounted and supported to one of the vehicle body frame members so that the canister device is disposed inside one of the vehicle body frame members and in back of transfer unit. The pair of vehicle body frame members each includes a portion which is bent inwardly at the front end. The canister device is positioned so that the canister device is prevented from contacting the transfer unit by an outward deformation of the frame member when the vehicle is involved in a collision.

The present invention can also be accomplished by an under body structure of a four wheel drive automotive vehicle including a transfer unit for transferring the engine output to the four wheels of the vehicle. A pair of vehicle body frame members are disposed under a floor panel of the vehicle and extend along a length of the vehicle. The pair of vehicle body frame members are interconnected with a first cross member, a second cross member and a third cross member. The first cross member interconnects the front ends of the pair of vehicle body frame members. The second cross member interconnects the pair of vehicle body frame members in back of the first cross member. The third cross member interconnects the pair of vehicle body frame members in back of the second cross member. The second and third cross members are connected to the pair of vehicle body frame members such that the stiffness or rigidity of the connection of the second cross member to the vehicle body frame members is less than the connection stiffness or rigidity of the third cross member to the vehicle body frame members. A canister device for taking in fuel vapor from the fuel tank is supported on one of the vehicle body frame members so that the canister device is disposed in back of the transfer unit and between the second cross member and the third cross member. The pair of vehicle body frame members are formed so that the front end portions thereof are positioned inwardly from connection locations of the frame members with the third cross member.

BRIEF DESCRIPTION OF THE DRAWINGS

The above object and other features of the present invention will be apparent to those skilled in the art from the following description of the preferred embodiments thereof when considered in conjunction with the appended drawings in which.

DETAILED DESCRIPTION OF THE PREFERRED EMBODIMENTS

Figure 1:
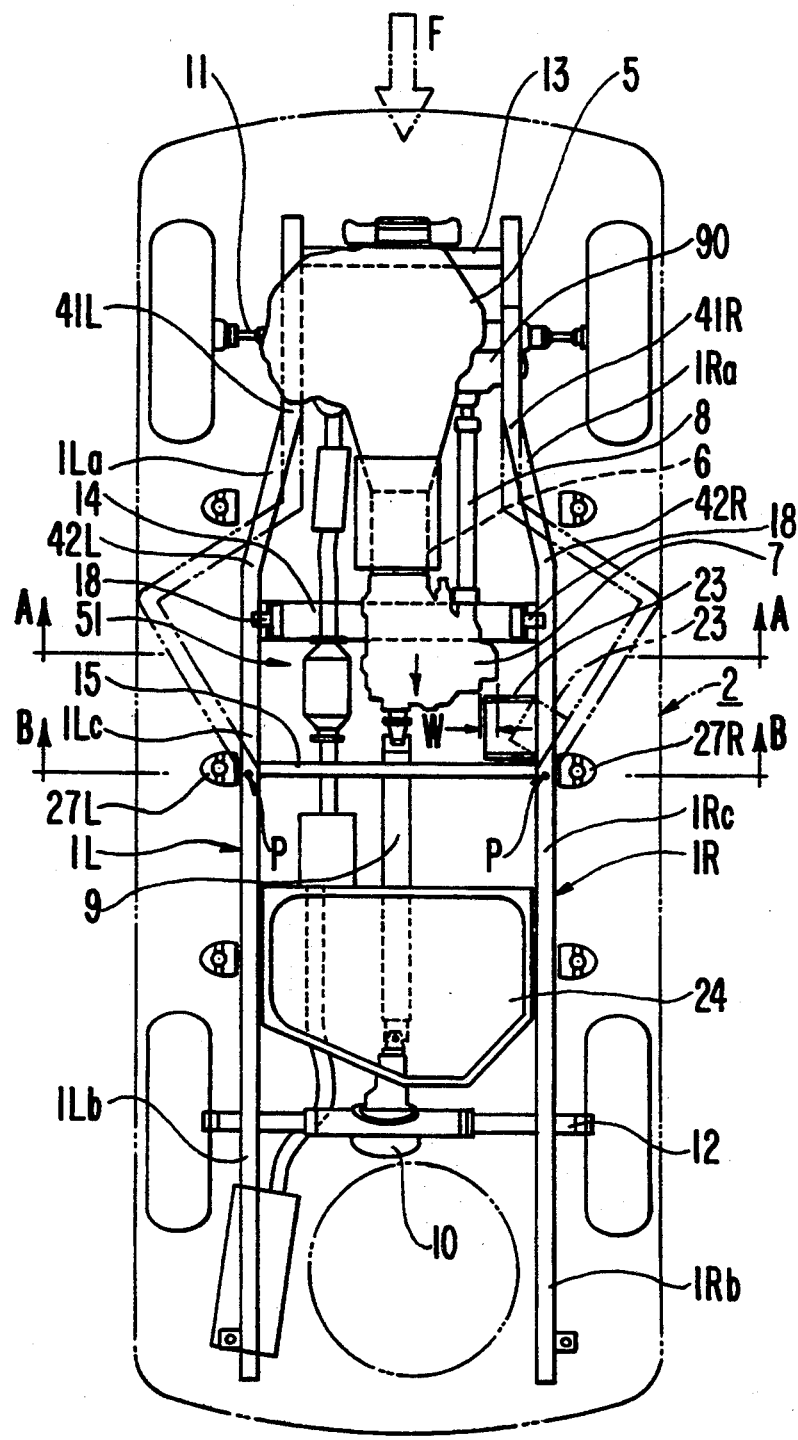
FIG. 1 is a plan view of an under body structure of an automotive vehicle in accordance with a preferred embodiment of the present invention.
Figure 2:
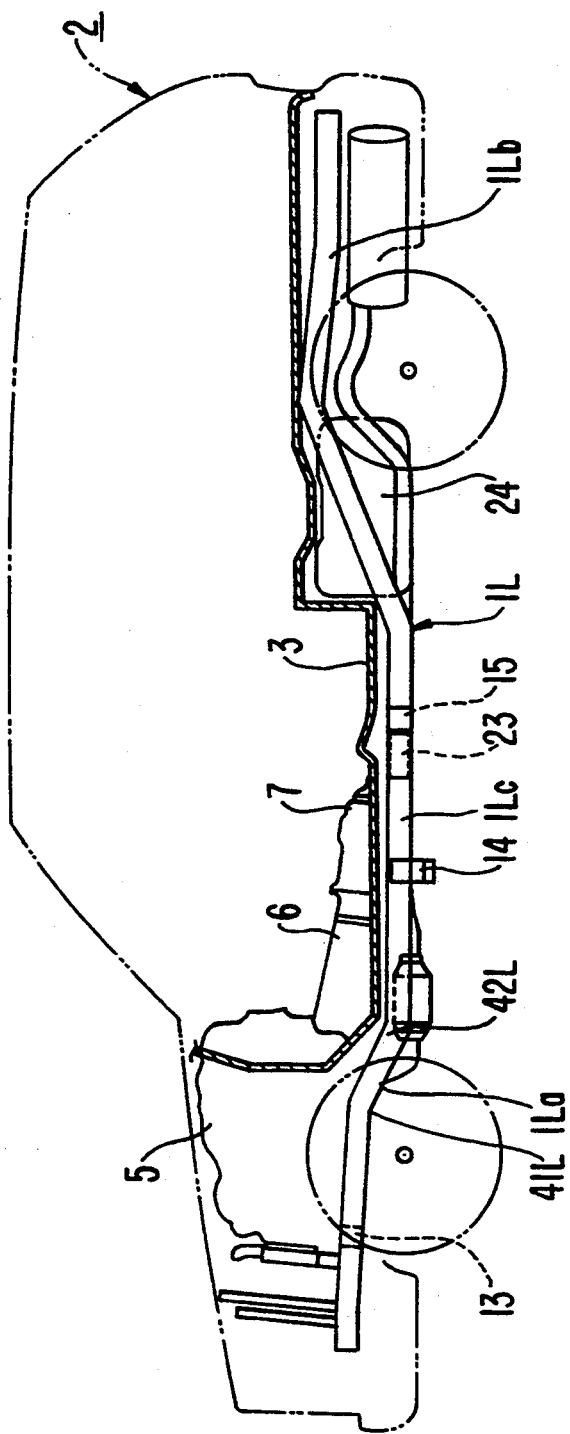
FIG. 2 is a side view of the under body structure of the automotive vehicle shown in FIG. 1.

FIGS. 1 and 2 illustrate an under body structure of a four-wheel drive automotive vehicle in accordance with a preferred embodiment of the present invention. A pair of side frames 1L, 1R are disposed under a floor panel 3 of the vehicle 2 and extend in a longitudinal direction of the vehicle 2. The side frames 1L, 1R have front side frame portions 1La, 1Ra, rear side frame portions 1Lb, 1Rb, and center frame portions 1Lc, 1Rc, respectively. The side frames 1L, 1R are formed so that the front side frame portions 1La, 1Ra and rear side frame portions 1Lb, 1Rb are higher than the center side frame portions 1Lc, 1Rc, as shown in FIG. 2. Further, the front side frame portions 1La, 1Ra are bent inwardly so that they have first bent portions 41L, 41R and second bent portions 42L, 42R, as shown in FIG. 1. Front end portions 1La, 1Ra of the side frame 1L, 1R are positioned inwardly when compared to the center frame portions 1Lc, 1Rc. An engine 5 is mounted on and between this reduced width portion of the side frames 1L, 1R.

A transmission 6 is connected to a rear end of the engine 5 and a transfer unit 7 is disposed behind the transmission 6. The transfer unit 7 transfers the engine output to a front axle 11 and a rear axle 12 through a first propeller shaft 8 and a second propeller shaft 9, respectively. The first propeller shaft 8 is connected to the front axle 11 through a first differential gear unit 90, and the second propeller shaft 9 is connected to the rear axle 12 through a second differential gear unit 10.

Reference numbers 13 through 15 denote first, second and third cross members which interconnect the side frame members 1L, 1R, respectively. The first cross member 13 interconnects front end portions of the front side frame portions 1La, 1Ra. The second cross member 14 interconnects the rear end portions of the front side frame portions 1La, 1Ra. The third cross member 15 interconnects the center frame portions 1Lc, 1Rc. The second cross member 14 mounts the transfer unit 7 at a center portion thereof through a mount member (not shown).

Figure 3:
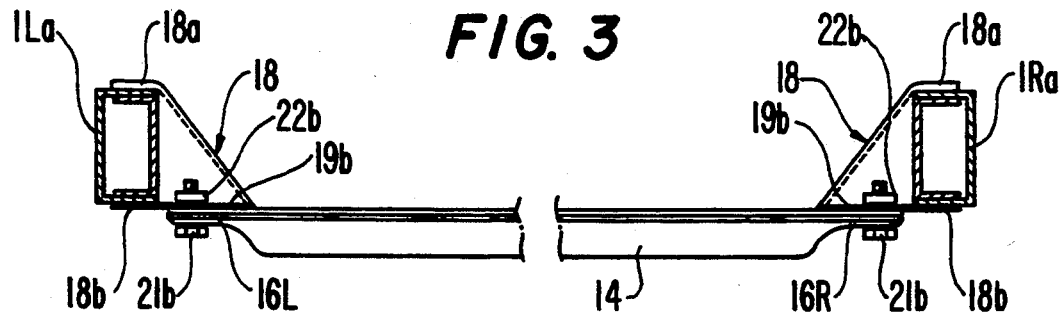
FIG. 3 is a cross sectional view of FIG. 1, taken along section line A—A.
Figure 4:
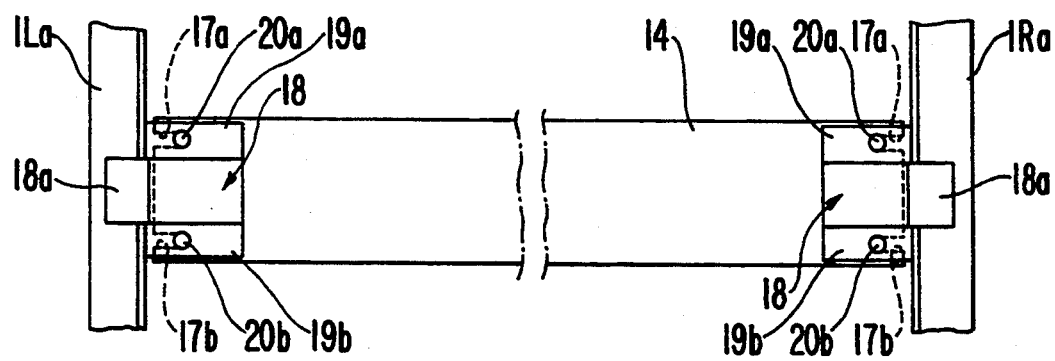
FIG. 4 is a partial plan view of the under body structure of the automotive vehicle shown in FIG. 3.
Figure 5:
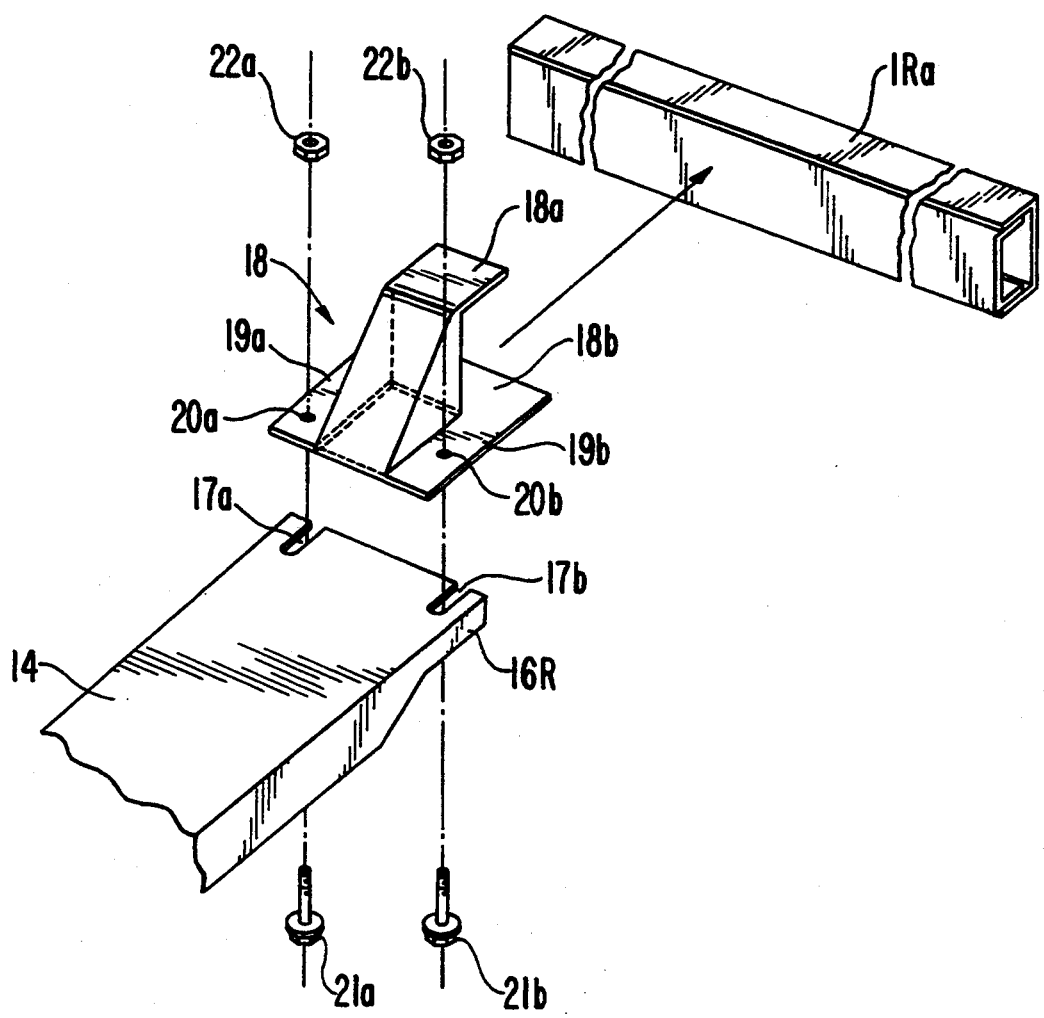
FIG. 5 is a partial exploded view of the under body structure of the automotive vehicle shown in FIG. 4.
Figure 6:
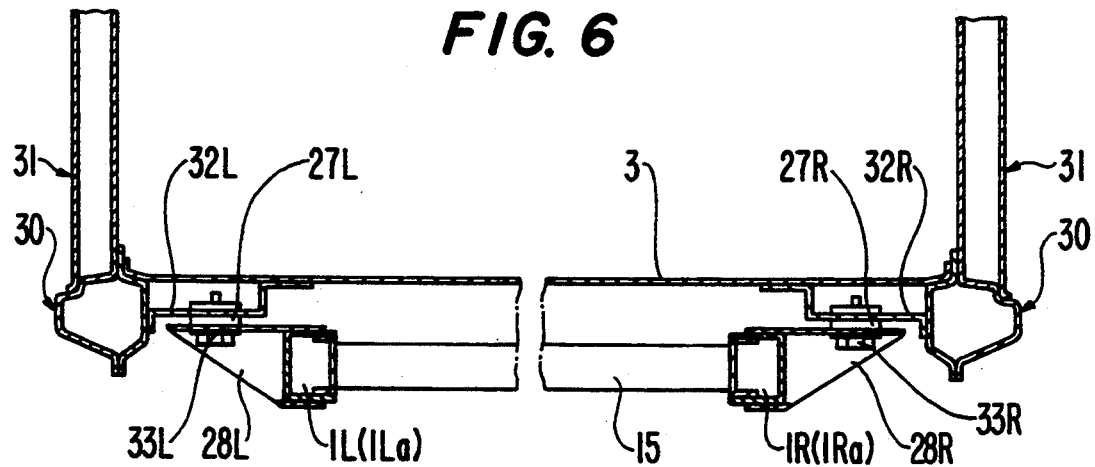
FIG. 6 is a cross sectional view of FIG. 1, taken along section line B—B.

The second cross member 14 has flat flange portions 16L, 16R at both ends, as shown in FIGS. 3 through 5. A pair of U-shaped notches 17a, 17b are formed at the flange portions 16L, 16R, respectively. Both ends of the second cross member 14 are connected to connecting brackets 18 fixed to the side frame 1L, 1R by bolts 21a, 21b and nuts 22a, 22b. The connecting bracket 18 has a upper flange portion 18a and a lower flange portion 18b. The upper flange portion 18a is welded to an upper surface of the side frame. The lower flange portion 18b is also welded and is attached to a lower surface of the side frame. The mounting bracket 18 also has a pair of connection portions 19a, 19b which are integral with the lower flange portion 18b thereof. The connection portions 19a, 19b have bolt holes 20a, 20b. U-shaped notches 17a, 17b are formed in the flange portion 16L, 16R so that the bolts 21a, 21b go through the notches 17a, 17b and bolt holes 20a, 20b as shown in FIG. 5.

The second cross member 14 can be connected the side frame firmly by fastening the nuts 22a, 22b onto the bolts 21a, 21b with an appropriate torque. The notches 17a, 17b have open ends as shown in FIGS. 4 and 5 so that the connection between the cross member 14 and the side frames 1L, 1R can be removed by a large impact force which can occur when the vehicle collides.

Figure 7:
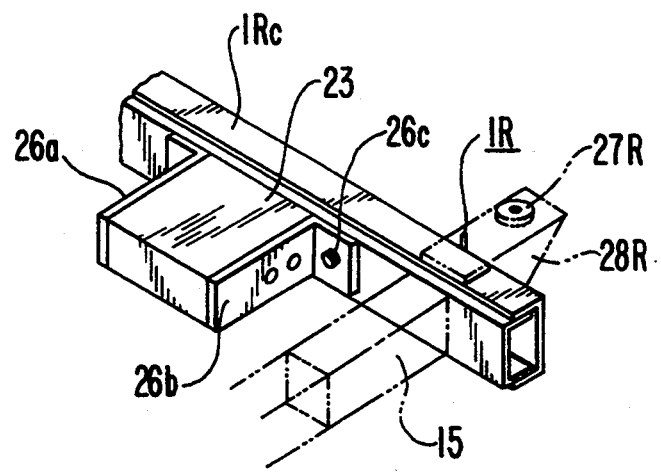
FIG. 7 is a partial perspective view of the under body structure of the automotive vehicle shown in FIG. 1.

On FIG. 1, reference number 23 denotes a canister device. The canister device 23 is connected to a fuel tank 24 through a tube (not shown) so that the fuel vapor is taken in and trapped temporarily by a canister element of the canister device 23. The canister device 23 is connected to an inner surface of the right side frame 1R through brackets 26a, 26b and bolt 26c, as shown in FIG. 7. The canister device 23 is disposed in an open space behind the transfer unit 7. As shown in FIG. 1, part of the canister device 23 overlaps with a portion of the transfer unit 7 in a direction of a width of the vehicle or, in other words, when viewed in a longitudinal direction of the vehicle. The amount of overlap is indicated by reference numeral W in FIG. 1.

Mount brackets 28L, 28R having floor mount members 27L, 27R are fixed to outside portions of the side frames 1L, 1R. The floor panel 3, the side sills 30 and the pillars 31 are then mounted on the mount brackets 28L, 28R by connecting members 32L, 32R, mount members 27L, 27R and bolts 33L, 33R. The vehicle is also includes an engine exhaust-gas device 51 which includes gas pipes and a catalyst.

According to the structure noted above, the operation of present invention now will be described. When the vehicle 2 collides with another object, an impact force F acts on a front portion of the vehicle 2, as shown in FIG. 1. Then the engine 5 and the transfer unit 7 are pushed back by the impact force F. The impact force F also acts on the front end portion of the side frame 1L, 1R at the same time so that a portion the side frame 1L, 1R will be deformed outwardly. Because of the particular design of the side frame members and the connection provided between the side frame members and the second cross member, the side frame in the region of the second cross member is deformed outwardly as shown in a phantom line in FIG. 1. Since the canister device 23 is supported on the side frame 1R, it is also moved outwardly as shown in a phantom line in FIG. 1. This position change of the canister device 23 allows the transfer unit 7 to move rearwardly without contacting the canister device 23. Therefore, the canister device 23 can be saved from being broken by the transfer unit 7 when the vehicle is involved in a collision.

The cross member 14 is connected to the side frame 1L, 1R by a bolt-nut fastening connection as described above. The arrangement of this connection including the U-shaped notches 17a, 17b allows the side frame 1L, 1R to effectively separate from the second cross member and change its shape as noted above. Furthermore, since the third cross member 15 is firmly connected to the side frame 1L, 1R by welding a pivot point is supplied at a connecting point P of these members. This welded joint effectively prevents this portion of the side frame from moving even if the vehicle is involved in a collision. This assures the deformation of the side frame 1L, 1R as shown in the phantom line in FIG. 1. The stiffness of the point P is also enhanced by the structure in which the side fames 1L, 1R are connected to other members, such as the floor panel 3, through mount members 27L, 27R.

It is to be understood that although the invention has been described in detail with respect to a preferred embodiment thereof, various other embodiments and variants are possible which fall within the spirit and scope of the invention, and such embodiments and variants are intended to be covered by the following claims.

What is claimed is:

1. An under body structure of an automotive vehicle, comprising:
    a transfer unit for transferring an output of an engine to at least one vehicle wheel;
    a vehicle body frame member disposed under a floor panel of the vehicle and extending in a longitudinal direction of the vehicle;
    a canister device for taking in fuel vapor from a fuel tank, said canister device being supported by said vehicle body frame member and disposed rearwardly of said transfer unit; and
    means for causing a portion of said frame member supporting said canister device to outwardly deform to prevent said canister device from contacting said transfer unit as said transfer unit moves rearwardly in a collision.

2. An under body structure of an automotive vehicle as defined claim 1, wherein said canister device is supported on said vehicle body frame member so that prior to the vehicle impact, a portion of said canister device and a portion of said transfer unit overlap when viewed in a longitudinal direction of the vehicle.

3. An under body structure of an automotive vehicle as defined claim 1, wherein said means for displacing said canister device displaces said canister device outwardly away from a longitudinal axis of the vehicle.

4. An under body structure of an automotive vehicle as defined claim 1, wherein means for displacing said canister device displaces said canister device by a deformation of said vehicle frame member.

5. An under body structure of an automotive vehicle, comprising:
    a transfer unit for transferring an engine output to at least two wheels of the vehicle, said transfer unit being disposed under a floor panel of the vehicle;
    a first propeller shaft connected to said transfer unit for driving said front wheels;
    a second propeller shaft connected to said transfer unit for driving rear wheels;
    a pair of vehicle body frame members disposed under the floor panel of the vehicle and extending in a longitudinal direction of the vehicle;
    a cross member disposed between the vehicle body frame members and on which said transfer unit is mounted;
    a canister device for taking in fuel vapor from a fuel tank, said canister device being supported by and attached to one of said vehicle body frame members, said canister device being located rearwardly of said transfer unit; and
    wherein at least one of said frame members includes means for causing a portion of said frame member supporting said canister device to outwardly deform to prevent said canister device from contacting said transfer unit as said transfer unit moves rearwardly in a collision, and said vehicle body frame members are formed so that front end portions of said frame members are disposed closer together than other portions of said frame members and so that said transfer unit is prevented from contacting said canister device by an outward deformation of at least one of said vehicle body frame members when the vehicle experiences an impact force.

6. An under body structure as defined in claim 5, wherein said canister device is supported on said vehicle body frame member so that prior to the vehicle impact, a portion of said canister device and a portion of said transfer unit overlap when viewed in a longitudinal direction of the vehicle.

7. An under body structure as defined in claim 5, wherein a portion of said vehicle body frame member adjacent to said canister device is connected to the floor panel of the vehicle via a mount member.

8. An under body structure as defined in claim 5, further comprising an additional cross member disposed between said frame members, said additional cross member being disposed adjacent to said canister device.

9. An under body structure as defined in claim 5, wherein said canister device is supported on an inside surface of one of the vehicle body frame members.

10. An under body structure as defined in claim 5, wherein said vehicle body frame members, extending along a length of the vehicle, have at least two locations where a direction of extension of said vehicle body frame members changes.

11. An under body structure as defined in claim 5, further comprising an engine exhaust-gas device extending substantially in the longitudinal direction of the vehicle, said canister device being disposed on one of said frame members and said engine exhaust-gas device being located closer to the other of said frame members than said frame member having said canister device disposed thereon.

12. An under body structure of a four-wheel drive automotive vehicle, comprising:
    a transfer unit for transferring an output of an engine to four wheels of the vehicle;
    a pair of vehicle body frame members disposed under a floor panel of the vehicle and extending generally in a longitudinal direction of the vehicle, the pair of vehicle body frame members being interconnected by a first cross member, a second cross member and a third cross member, said first cross member interconnecting a front portion of said pair of vehicle body frame members, said second cross member interconnecting said pair of vehicle body frame members and being located rearwardly of said first cross member, said third cross member interconnecting said pair of vehicle body frame members and being located rearwardly of said second cross member, and wherein said second and third cross members are connected to said pair of vehicle body frame members so that a stiffness of a connection between said second cross member and said pair of vehicle body frame members is smaller than a stiffness of a connection between said third cross member to said pair of vehicle body frame members; and
    a canister device for taking in fuel vapor from a fuel tank, said canister device being supported by one of said vehicle body frame members and disposed in back of said transfer unit and between said second cross member and said third cross member, said pair of vehicle body frame members having front portions thereof which are closer together than the locations of the connections with said second and third cross members.

13. An under body structure as defined in claim 12, wherein said transfer unit is mounted on said second cross member.

14. An under body structure as defined in claim 12, wherein the floor panel is connected through a mount member to a portion of said vehicle body frame member adjacent to said canister device.

15. An under body structure as defined in claim 12, wherein said pair of vehicle body frame members have at least two bent portions.

16. An under body structure as defined in claim 12, further comprising an engine exhaust-gas device extending substantially in the longitudinal direction of the vehicle, said canister device being disposed on one of said frame members and said engine exhaust-gas device being located closer to the other of said frame members than said frame member having said canister device disposed thereon.

17. An under body structure as defined in claim 12, further comprising a first propeller shaft for transferring power to the front wheels and a second propeller shaft for transferring power to the rear wheels.

18. An under body structure as defined in claim 17, wherein the first propeller shaft is disposed in the longitudinal direction of the vehicle on the same side of the vehicle as said canister device.

* * * * *